United States Patent [19]
Han

[11] Patent Number: 5,486,873
[45] Date of Patent: Jan. 23, 1996

[54] SCREEN-ART CIRCUIT ADOPTING AN ANALOG METHOD

[75] Inventor: Hong-gyu Han, Suwon, Rep. of Korea

[73] Assignee: Samsung Electronics Co., Ltd., Kyungki-do, Rep. of Korea

[21] Appl. No.: 135,487

[22] Filed: Oct. 13, 1993

[30] Foreign Application Priority Data

Oct. 13, 1992 [KR] Rep. of Korea .................. 92-18789

[51] Int. Cl.$^6$ ..................................................... H04N 5/262
[52] U.S. Cl. ............................................. 348/578; 348/571
[58] Field of Search ..................................... 358/181, 183, 358/22, 160, 188, 140; 348/571, 576, 577, 580, 581, 582, 578, 584, 588; H04N 7/01, 5/262

[56] References Cited

U.S. PATENT DOCUMENTS

| | | | |
|---|---|---|---|
| 4,888,643 | 12/1989 | Kusakabe | 348/578 |
| 4,891,702 | 1/1990 | Nakayama et al. | 348/561 |

FOREIGN PATENT DOCUMENTS

| | | |
|---|---|---|
| 0046370 | 4/1981 | Japan . |
| 0015372 | 1/1984 | Japan . |
| 0012474 | 5/1991 | Japan . |

OTHER PUBLICATIONS

Matley, J. Brian "A Digital Framestore Synchronizer" SMPTE Journal vol. 85 No. 6 Jun. 1976.

*Primary Examiner*—David E. Harvey
*Attorney, Agent, or Firm*—Sughrue, Mion, Zinn, Macpeak & Seas

[57] ABSTRACT

The present invention is an analog screen-art circuit for displaying a video signal resembling a picture on a screen. The screen-art circuit includes a video signal processor having a color killer circuit for eliminating chrominance signals in a composite video signal. The screen-art circuit also includes an art mode selector for controlling the operation of the screen-art circuit, a number of serially connected delay elements for delaying the signal generated by the video signal processor by respective 1H periods and a switch for selectively switching the signals generated from the video signal processor and the 1H delays when operating in the art mode. The switch is responsive to a control signal provided by a control signal generator which logically combines a number of signals, one of which is based on a composite sync signal generated from the video processor. According to one embodiment of the invention, the other of the two signals is a head switching signal which is commonly found in most VCRs. According to a second embodiment, the other of the two signals is a vertical sync signal which is again extracted from the composite video signal.

7 Claims, 2 Drawing Sheets

5,486,873

1

SCREEN-ART CIRCUIT ADOPTING AN ANALOG METHOD

FIELD OF THE INVENTION

The present invention relates to a video signal processing circuit of a video signal processing device and, more specifically, to a screen-art circuit providing a screen-art function in an analog manner so that a displayed video signal resembles a picture.

The present application is based on Korean Patent Application No. 92-18789, which is incorporated herein by reference for all purposes.

BACKGROUND OF THE INVENTION

The screen-art function in a video signal processing device is the specific function which imparts a picturesque feel so that an image appearing on a screen looks like a handpainted picture, i.e., the image is not sharp like a photograph, by eliminating color from the composite video signal and reducing image resolution.

In a conventional video signal processing device such as a television or video tape recorder (VTR), the screen-art function is performed so that a photo-like picture is displayed on a screen and the above-described "picturesque" picture can be viewed via the screen when viewing standard broadcast signals. However, the screen-art function cannot be performed by selecting the functions of the video signal processing device itself.

Accordingly, while a digital screen-art circuit has been incorporated in order to perform the screen-art function in the general video signal processing device, the composition of such circuits is complicated and the associated cost is high.

The present invention was motivated by a desire to overcome the above problems found in the prior art.

SUMMARY OF THE INVENTION

Therefore, the principal object of the present invention is to provide a screen-art circuit which displays a picturesque video signal on a screen after processing the video signal in an analog manner, when using a video signal processing device.

These and other features and advantages of the present are provide by an analog screen-art circuit in a video signal processing device provided with video signal processor including a color killer circuit to eliminate a color signal, e.g., a color component, from an applied video signal received from a plurality of heads . The screen-art circuit includes:

art mode selector for selecting one of an operating mode and non-operating mode of the screen-art circuit;

a plurality of delay devices delaying the signals generated from the video signal processor by one horizontal scanning period (1H);

a switch for selectively switching the signals generated from the video signal processor and the delay devices in a predetermined order when said operating mode is selected by the art mode selector; and a control signal generator for generating a control signal by logically combining switching signals controlling the heads and a composite sync signal generated from

2 the video signal processor in order to control said switch.

These and other objects, features and advantages of the invention are disclosed in or apparent from the following description of preferred embodiments.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENT

The detailed description of the present invention is made as follows, with reference to the attached drawings.

Figure 1:
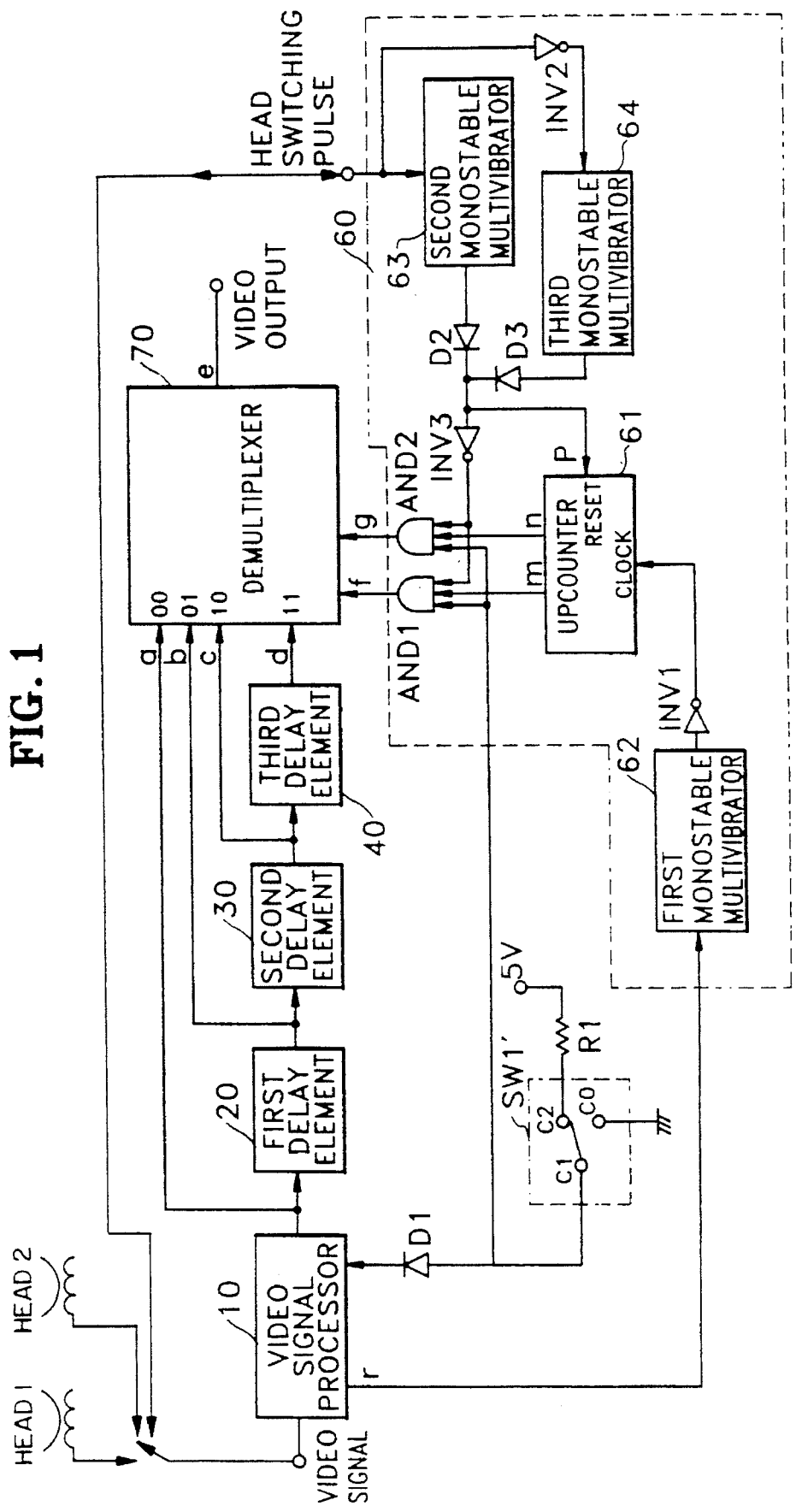
FIG. 1 is a circuit diagram showing an analog screen-art circuit according to a preferred embodiment of the present invention.

The screen art circuit illustrated in FIG. 1 comprises a first delay element 20 for delaying the signal generated from a video signal processor 10 by 1H, where "H" represents a horizontal scanning period, i.e., 63.5 μs, a second delay element 30 for further delaying the signal delayed in first delay element 20 by 1H, a third delay element 40 for still further delaying the signal delayed by 1H in second delay element 30 by 1H, a demultiplexer 70 for selectively switching and generating one signal among four signals. More specifically, demultiplexer 70 produces one output signal from four input signals, including the signal generated from video signal processor 10 at first input terminal a, the signal generated from first delay element 20 at second terminal b, the signal generated from second delay element 30 at third terminal c and the signal generated from third delay element 40 at fourth terminal d, respectively. A control signal generator 60 advantageously produces a control signal to control demultiplexer 70 in response to a composite sync signal generated from video signal processor 10 and a second repetitive signal, which signal advantageously can be a head switching pulse. An first terminal of signal processor 10 is connected to contact point $c_1$ of art mode selector SW1 via first diode D1. Contact point $c_1$ of art mode selector SW1 is connected with third input terminals of first and second AND gates AND1 and AND2, respectively. Contact point $c_2$ of art mode selector SW1 is connected with a +5 V terminal through resistor R1, while contact point $c_0$ is grounded.

Preferably, control signal generator 60 comprises a first monostable multivibrator 62 to which a composite sync signal generated from video signal processor 10 is applied and a first inverter INV1 for generating the inverted signal applied to an up-counter 61 in response to the signal generated from first monostable multivibrator 62. Moreover, a second monostable multivibrator 63 advantageously can receive a head switching pulse directly and a third monostable multivibrator 64 can receive the head switching pulse via a second inverter INV2.

Preferably, a common node connecting second monostable multivibrator 63 and a third monostable multivibrator 64 via second diode D2 and third diode D3, respectively. A third inverter INV3 and up-counter 61 receive signals from second and third diodes D2 and D3, respectively. First and second AND gates AND 1 and AND2 advantageously perform logical operations after receiving the signal generated from third inverter INV3 at a first input terminal, the signals from output terminals m and n of up-counter 61 at a second input terminal and the signal generated from terminal $c_1$ of art mode selector SW1 at a third input terminal.

Figure 2A:
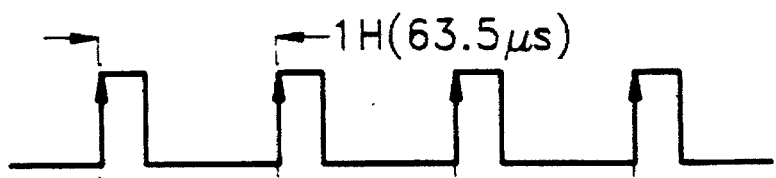
FIGS. 2A through 2C are waveform diagrams which are useful in explaining the formation of a clock signal applied to the clock terminal of the up-counter illustrated in FIG. 1.
Figure 2B:
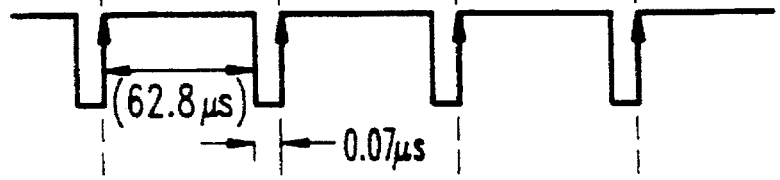
Figure 2C:

FIGS. 2A through 2C are waveform diagrams showing the formation of a clock signal applied to the clock terminal of the up-counter 61 illustrated in FIG. 1. More specifically, FIG. 2A is a waveform diagram showing a composite sync signal generated from output terminal r of video signal processor 10. FIG. 2B is a waveform diagram showing the signal generated from first monostable multivibrator 62, and FIG. 2C is a waveform diagram showing the signal generated from first inverter INV1.

Figure 3A:
FIGS. 3A through 3E are waveform diagrams useful in explaining a process for forming a control signal used in controlling the demultiplexer depicted in FIG. 1.
Figure 3B:
Figure 3C:
Figure 3D:
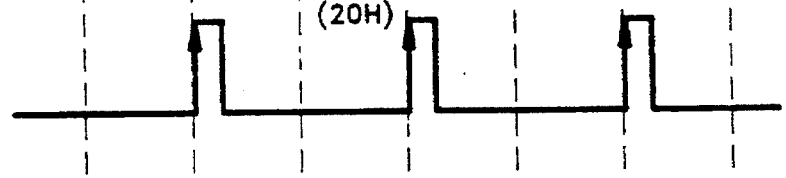
Figure 3E:
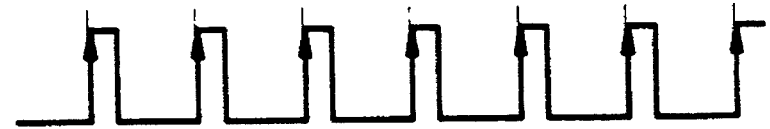

FIGS. 3A through 3E are waveform diagrams showing the formation process of the control signal for controlling the demultiplexer 70 of FIG. 1. More specifically, FIG. 3A is a waveform diagram showing the head switching pulse, FIG. 3B is a waveform diagram showing the signal generated from second inverter INV2, FIG. 3C is a waveform diagram showing the signal generated from second monostable multivibrator 63, FIG. 3D is a waveform diagram showing the signal generated from third monostable multivibrator 64, and FIG. 3E is a waveform diagram a reset terminal p of up-counter 61.

A general description of the operation according to the present invention will be while referring to the accompanying drawings. It will be understood the operating mode will change depending on the user's selection of the screen-art mode or normal mode.

When the user selects the normal mode, contact point $c_1$ of art mode selector SW1 is connected with contact point $c_0$ which is grounded. Thus, the color killer circuit included in video signal processor 10 does not operate and the original signal is processed in video signal processor 10 and applied to first input terminal a of demultiplexer 70. The video signals which are each delayed by 1H in first, second and third delay elements 20, 30 and 40 can be applied to input terminals b, c and d of demultiplexer 70, respectively.

Preferably, since first contact point $c_1$ of art mode selector SW1 is grounded, the signal applied to the third input terminals of first and second AND gates AND1 and AND2 becomes a logic "low," the outputs of first and second AND gates AND1 and AND2 also go low, and the combination of the control signals applied to fifth and sixth input terminals f and g of demultiplexer 70 are always "00" irrespective of a received head switching pulse and a composite sync signal generated from output terminal r of video signal processor 10. Therefore, demultiplexer 70 selects the original video signal applied to the first input terminal a and switches the selected signal to output terminal e.

On the other hand, if the user selects the screen-art mode, contact point $c_1$ of art mode selector SW1 is connected with contact point $c_2$ which is supplied with a predetermined voltage, e.g., with 5 V. Then, the signal of video signal processor 10, in which the color signal is eliminated from the video signals, is applied to first input terminal a of demultiplexer 70 by advantageously operating a color killer circuit by applying the +5 V voltage source to the color killer circuit of video signal processor 10 through first diode D1. The signals delayed by 1H each in first through third delay elements 20–40 are applied to second through fourth input terminals b, c and d of demultiplexer 70, respectively.

Preferably, since contact point $c_1$ of art mode selector SW1 is connected with 5 V, the signal applied to third input terminals of first and second AND gates AND1 and AND2 becomes a logic high. Thus, the outputs of first and second AND gates AND1 and AND2 which are the combination of the control signals f and g controlling the operation of demultiplexer 70 is determined by the operations of multivibrators 62 through 64 and up-counter 61 to which the composite sync signal generated from video signal processor 10 and the head switching pulse are input.

More specifically, the description of the formation process by which the combination of control signals f and g for controlling demultiplexer 70 immediately follows. The processing of the composite sync signals generated from output terminal r of video signal processor 10 will be discussed first.

Generally, for the protection of the sync signal of a video signal, the forward portion of the sync signal consists of a so-called front porch while the rearward portion thereof is termed a back porch. A color burst signal is loaded on the back porch. In order to switch video signals at 1H intervals, the portion to be switched should be switched during some concealed, e.g., unseen, portion on the screen such as the front or back porch, i.e., where the informational content of the video signal is not being used. Then, the images can be viewed naturally without noticing the switching noise and the connecting portions of the screen. Therefore, in the present invention, a first monostable multivibrator 62 and a first inverter INV1 are used in order to switch the video signal during the front porch at 1H intervals. More specifically, since the front porch is located in front of the sync signal with a 0.02H interval, normally, the switching is carried out about 0.01H before the sync signal occurs.

If a time constant $t_1$ of first monostable multivibrator 62 is 62.8 μs, a waveform of FIG. 2B is obtained from the waveform of the composite sync signal in FIG. 2A. More specifically, the falling edge is located at the front porch. If the output signal of the first monostable multivibrator 62 passes first inverter INV1 to change the falling edge into a rising edge, the pulse of the waveform having a rising edge at the front porch, as illustrated in FIG. 2C, is applied to up-counter 61 and then the output terminals m and n of up-counter 61 are incremented by one during each 1H interval.

Preferably, the time constant $t_1$ of the first monostable multivibrator 62 is set at 62.8 μs, which advantageously is the medium value satisfying the condition of 62.23 μs<$t_1$<63.5 μs. This value should be chosen in order that the switching can be made with respect to the front porch, which is located approximately 0.98H~1H ahead of the sync signal.

Now, the description of the processing of a head switching pulse for switching between pickups, e.g., heads, will be provided.

One field of an video signal is composed of 262.5 lines, i.e., 262.5H, including two equalizing pulses of 3H, a vertical synchronizing signal of 3H, a flyback signal of 12H, which scans during the non-viewing portion of the screen, and the remaining 241.5H, which is the portion of the video signal bearing the actual image information. Since the equalizing pulse (6H) and the vertical sync signal (3H) are used for the vertical synchronization of the video signal and for interlaced scanning, these signals themselves should not be changed. Therefore, the art mode should not be operated during the time corresponding to this portion (6H+3H). It will also be appreciated that performing an art mode function during the portion of the signal which is not seen on the screen would be meaningless. Therefore, in order to protect the vertical sync signal and the equalizing signal, the art mode preferably should be not operated until the 12H position from the head switching pulse since the vertical sync signal is located in the 5H–8H portion from the head switching pulse and the equalizing pulses of 3H are located in front of and, in back of the vertical sync signal. However, for more clearance, the art mode according to the present invention is not operated until the 20H point has been reached (1.27 ms after the head switching pulse). Within this 20H portion, since the 8H interval in which the art mode is not operated is located within the 12H flyback portion (not seen on the screen), the viewed output is unaffected.

When the head switching pulse in FIG. 3A is applied to second monostable multivibrator 63, the output thereof becomes the waveform as shown in FIG. 3C. Preferably, when the inverted head switching pulse of FIG. 3B is applied to third monostable multivibrator 64 which is the same as second monostable multivibrator 63, the output becomes the waveform as shown in FIG. 3D. These are added to be the waveform in FIG. 3E through first diode D1 and second diode D2.

More specifically, two of the monostable multivibrators are used because there are equalizing pulses and a vertical synchronizing signal for each field and the art mode should not to be operated during the portions of the equalizing pulses and vertical sync signal for each field.

The description of the operation process of up-counter 61 and first and second AND gates AND1 and AND2 according to a clock signal and a reset signal will now be provided.

When the waveform of FIGS. 3E is applied to reset terminal p of up-counter 61, up-counter 61 is reset and the output terminals m and n of up-counter 61 both output logic zeros. The outputs of up-counter 61 are then applied to second input terminals of first and second AND gates AND1 and AND2.

Accordingly, the combination of control signals f and g of demultiplexer 70 becomes "00" during the 20 H-long high intervals of FIG. 3E and the signal "a" of first input terminal of demultiplexer 70 is switched to output terminal e.

The reset of up-counter 61 is released during the low intervals of FIG. 3E and the counted value of up-counter 61 is increased according to the clock signal. That is to say, the counted value is increased by one during the front porch interval of each horizontal period. Now, the signal applied to the second input terminal of first and second AND gates AND1 and AND2 through third inverter INV3 is a logic high. Therefore, demultiplexer 70 switches the first through fourth input signals "a" through "d" at 1H intervals and outputs them to output terminal e while the combination of control signals "f" and "g" generates "00," "01," "10" and "11," which are the same signals as those from output terminals m and n of up-counter 61.

Therefore, when the video signal from which the color signal is eliminated in video signal processor 10 and the signals generated from the 1H delay elements 20 through 40 are switched at 1H (63.5 µs) intervals, the signals applied to first through fourth input terminals a through d of demultiplexer 70 are all the same, and the reduction of the resolution to one fourth (¼) is made possible.

This is represented in the following table, in which A1 through A9 indicate video signals.

| | terminal(→) | | | | |
|---|---|---|---|---|---|
| time(↓) | input terminal a | input terminal b | input terminal c | input terminal d | output terminal e |
| present | A1 | — | — | — | A1 |
| 1 H later | A2 | A1 | — | — | A1 |
| 2 H later | A3 | A2 | A1 | — | A1 |
| 3 H later | A4 | A3 | A2 | A1 | A1 |
| 4 H later | A5 | A4 | A3 | A2 | A5 |
| 5 H later | A6 | A5 | A4 | A3 | A5 |
| 6 H later | A7 | A6 | A5 | A4 | A5 |
| 7 H later | A8 | A7 | A6 | A5 | A5 |
| 8 H later | A9 | A8 | A7 | A6 | A9 |

As indicated in the above table, since the same signals are repeated four times and then the operation of the present invention is advanced so that the signal following after 4H is repeated four times again. Accordingly, the resolution is reduced to one fourth (¼) and the displayed signal is skipped by 4H in view of time. Finally, the circuit according to the present invention gives a picturesque feeling.

More specifically, in forming the control signal for controlling demultiplexer 70, instead of the head switching pulse, a vertical synchronizing signal may be used for a color television, a laser disk player, etc.

As explained above in detail, in the screen-art circuit which adopts an analog mode according to the present invention, since it is possible to embody the screen-art function by a simple composition wherein the plural 1H-delayed signals are switched and generated at 1H intervals according to a control signal produced by logically combining a head switching pulse for switching between pickups, for example, heads, and composite sync signal, using plural monostable multivibrators and plural logic gates. Therefore, the circuit can be simplified.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A screen-art circuit having an analog mode of operation for a video signal processing device including a video signal processor having a color killer circuit for eliminating a color signal from an applied video signal received via a plurality of heads, said screen-art circuit comprising:

an art mode selector for selecting one of an operating mode and a non-operating mode of said screen-art circuit;

a plurality of delay devices, each of said delay devices delaying an output video signal generated from said video signal processor by one horizontal scanning period (1H);

a switch for selectively switching the output video signal generated from said video signal processor and said delay devices at 1H intervals, when an art mode is selected by said art mode selector, to produce screen art representing the output video signal; and control signal generator for generating a control signal by logical combination of a switching signal for switching the heads and a composite sync signal generated from said video signal processor so as to control said switch.

2. The screen-art circuit as claimed in claim 1, wherein said switch reduces the resolution of said output video signal by a 1/N ratio, by selectively switching between a plurality of N inputs, wherein N is an integer.

3. The screen-art circuit as claimed in claim 1, wherein said control signal generator comprises:

a first multivibrator for regulating a respective pulse width of said switching signal;

a second multivibrator for regulating a respective pulse width of a composite sync signal provided by said video signal processor to produce a regulated signal;

a counter for counting said regulated signal by applying said regulated signal as a clock signal having units of one horizontal scanning period; and a logical combining circuit for generating a combination control signal for controlling said switch by combining a first signal output by said counter, a second signal generated by said first multivibrator, and a third signal selected by said art mode selector.

4. A screen-art circuit having an analog mode of operation for a video signal processing device including a video signal processor receiving an applied video signal from a plurality of heads and having a color killer circuit for eliminating a color signal from the applied video signal for reducing the resolution of an output video signal by a 1/N ratio, where N is an integer, thereby producing screen art, said screen-art circuit comprising:

an art mode selector for selecting one of an operating mode and a non-operating mode of said screen-art circuit;

a plurality of delay devices, wherein each of said delay devices delaying the output video signal generated from said video signal processor by one horizontal scanning period (1H), and wherein all of said delay devices are serially connected;

a switch for selectively switching said output video signal generated from said video signal processor and said delay devices at 1H intervals, when an art mode is selected by said art mode selector, to produce said screen art; and a control signal generator for generating a control signal by logical combination of a switching signal for switching said heads and a composite sync signal generated from said video signal processor so as to control said switch, said signal generator comprising:

a first multivibrator for regulating a respective pulse width of a repetitively received signal associated with said video signal;

a second multivibrator for regulating a respective pulse width of a composite sync signal provided by said video signal processor to produce a regulated signal;

a counter for counting said regulated signal by applying said regulated signal as a clock signal having units of one horizontal scanning period; and a logical combining circuit for generating a combination control signal for controlling said switch by combining a first signal of said counter, a second signal generated by said first multivibrator, and a third signal selected by said art mode selector.

5. The screen-art circuit recited in claim 4, wherein said repetitively received signal is a vertical synchronizing signal.

6. The screen-art circuit recited in claim 4, wherein said repetitively received signal is a head switching pulse.

7. A screen-art circuit providing analog picture video signals having a resolution reduced by a ratio of 1/N, where N is an integer, and having a monochromatic aspect, via a video signal processor having a color killer circuit for eliminating a color signal from an applied video signal to thereby provide a first video signal, said screen-art circuit comprising:

a plurality of delay devices, wherein each of said delay devices delays said first video signal by one horizontal scanning period (1H), wherein a first of said delay devices is directly connected to the video signal processor, and wherein all of said delay devices are serially connected;

a switch directly connected to the video signal processor for repetitively routing said first video signal and output signals produced by respective said delay devices in a predetermined order to an output terminal of said switch, thereby producing said analog picture video signals, in response to a control signal, wherein said control signal corresponds to a logical combination of first and second selected portions of the applied video signal.

* * * * *